D. Ellenwood, Jr.

Upsetting Tires.

Nº 66,078. Patented Jan. 25, 1867.

Witnesses
W. H. Burning
J. Holmes

Inventor
Daniel Ellenwood

United States Patent Office.

DANIEL ELLENWOOD, JR., OF GARRETTSVILLE, OHIO

Letters Patent No. 66,078, dated June 25, 1867.

IMPROVEMENT IN MACHINE FOR SHRINKING TIRE

*The Schedule referred to in these Letters Patent and making part of the same.*

TO ALL WHOM IT MAY CONCERN:

Be it known that I, D. ELLENWOOD, Jr., of Garrettsville, in the county of Portage, and State of Ohio, have invented certain new and useful Improvements in Tire-Upsetting Machines; and I do hereby declare that the following is a full and complete description of the construction and operation of the same, reference being had to the accompanying drawings, making a part of this specification, in which—

Figure 1:
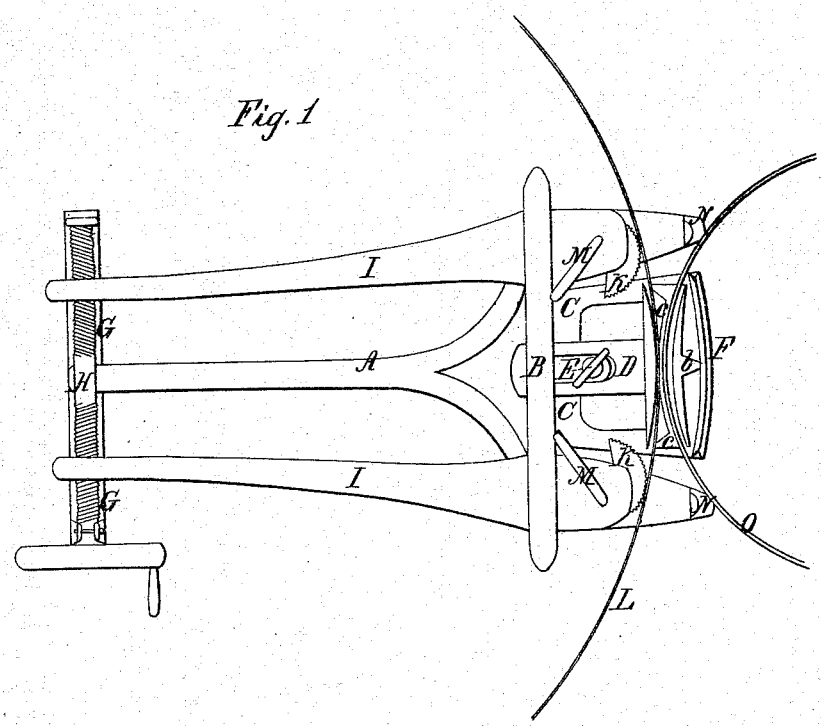
Figure 2:
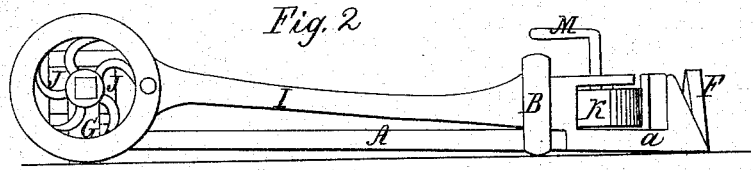
Figure 3:
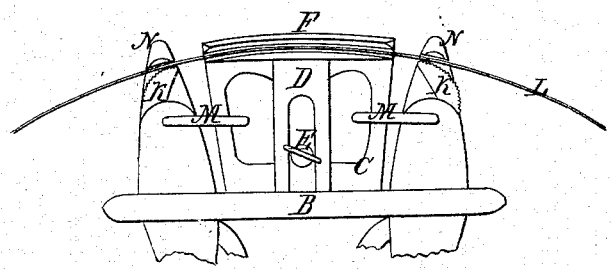

Figure 1 is a top view of the machine.
Figure 2 is a side view of the same.
Figure 3 is a detached section.
Like letters of reference refer to like parts in the views.

A, fig. 1, is an iron frame, of which B is a yoke placed transversely across the same near the head of the machine. This head C is provided with an adjustable shoulder, D, and which is secured to the frame by the thumb-screw E. On the outer end of the frame is a deep flange, F, which, it will be seen, slightly curves and conforms in its curvature and height with the shoulder. On the opposite end of the frame is fixed transversely the stay G, in the arms of which is journalled the screw H, which is both left and right-handed. I is a pair of levers, the long arms of which are attached to the screws by means of the nuts J, and are operated by the same, as will hereafter be shown. These levers are not pivoted to the frame but lie free upon it, and are kept in position by the yoke referred to, which also serves as a fulcrum, against which they act when in operation. The short arm of the levers is made in the peculiar shape, as shown at $a$, fig. 2, for the purpose that it may offer no obstruction to the space between the shoulder and flange, and also for the reception of the dogs or cams K, which are strongly pivoted to the lever, as shown in the drawing.

The operation of this machine is as follows: The tire to be upset is placed, while hot, between the shoulder and flange, as shown in fig. 1, in which L is the tire. First, however, the sections $b$ $c$ are removed and the flange and shoulder brought so close together as to admit only the thickness of the tire between, as shown in fig. 3. The cams or dogs are then turned by the handle M so as to bring them to bear against the tire, the sharp corrugations on the face of which prevent them from slipping. The position of the tire being thus arranged the power is applied by the screw H, which, on being turned by the hand-wheel, draws the arms of the levers outward with a corresponding reverse action of the short arms, which presses against the tire and causes it to shorten between the two cams. The backward pressure of the cam is resisted by the lugs N and flange F, against which the tire rests; also, the flange in connection with the shoulder prevents the tire from bending or kinking while being upset. The position of the tire and cams when the process of upsetting is accomplished is shown in fig. 1. Should the tire be of such a size as to interfere with the working of the screw it may be placed in the machine in the opposite direction, as shown in fig. 1, in which $o$ is a small tire. The sections $b$ and $c$ are placed between the shoulder and flange for the purpose of holding the tire while being acted upon by the cams and levers. The power is applied in the same way as in the former case and attended by the same results.

By the use of this machine the tire can be shortened without the trouble of cutting it for that purpose, hence much time, labor, and expense are thereby saved; also, it can be shortened to any degree required with equal certainty. The power applied being the combination of the screw and lever, and hence very great, heavy tires may be shortened up with ease and facility, and to a degree and certainty unattained by the old method.

What I claim as my improvement, and desire to secure by Letters Patent, is—

1. The frame A, yoke B, flange F, in combination with the adjustable shoulder D, for the purpose and in the manner specified.

2. Levers I, cams K, as arranged and operated by the screw H and adjustable nut J, in combination with the frame A, shoulder D, flange F, and yoke B, for the purpose and in the manner as set forth.

3. Sections $c$ and $b$, in combination with the flange F and shoulder D, for the purpose herein set forth.

DANIEL ELLENWOOD, JR.

Witnesses:
   O. A. TAYLOR,
   A. E. FRANCIS.